Dec. 16, 1969     S. J. POPEIL     3,484,252
PRODUCTION OF PUFFED POTATOES
Filed Oct. 19, 1965     2 Sheets-Sheet 2
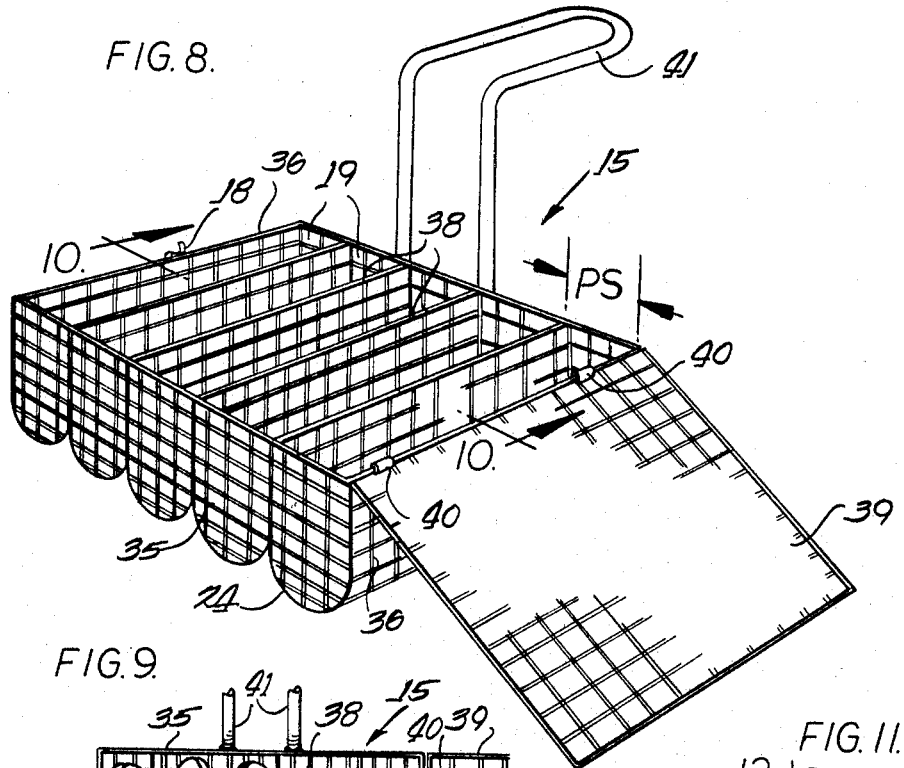
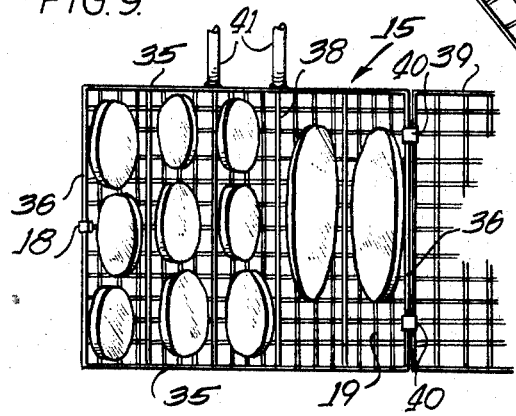
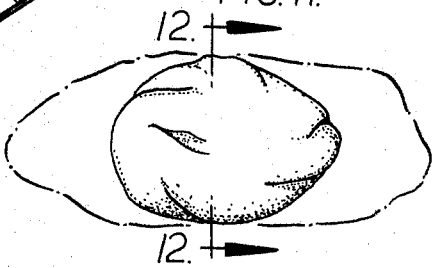
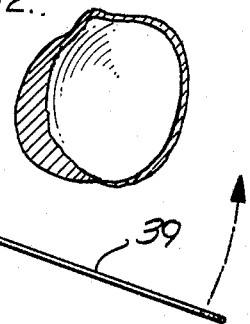
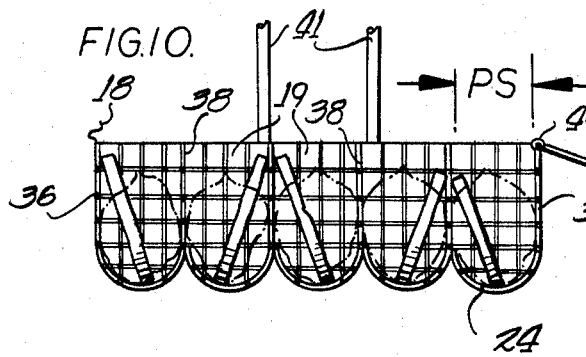
Inventor
Samuel J. Popeil
Dominik & Stein
Attorneys United States Patent Office 3,484,252
Patented Dec. 16, 1969

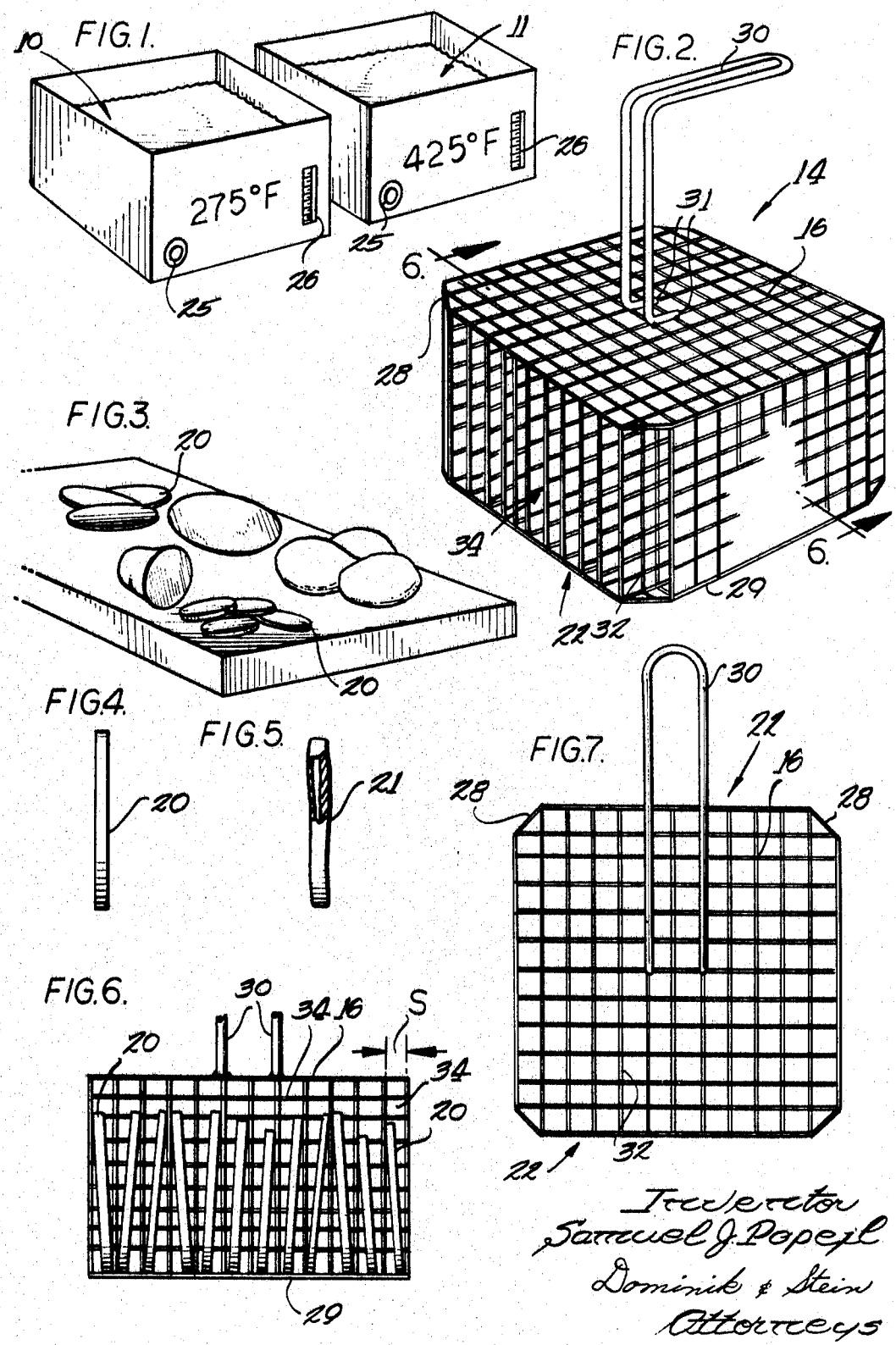

3,484,252
PRODUCTION OF PUFFED POTATOES
Samuel J. Popeil, 2920 N. Commonwealth Ave.,
Chicago, Ill. 60657
Filed Oct. 19, 1965, Ser. No. 497,849
Int. Cl. A23l 1/12
U.S. Cl. 99—100                                16 Claims

ABSTRACT OF THE DISCLOSURE

A method for making puffed potato products in which thin potato slices are sequentially cooked in baths at different temperatures. The potato slices are confined in edge orientation for submersion in oil baths. The method provides an improved, intermediate, partially expanded potato product which can be frozen and stored.

The present invention relates to a method, apparatus, and puffed potato product.

Puffed potatoes or potato souffle have been known for years. They have generally been prepared by first slicing potatoes to a thickness approximately one-eighth of an inch. Thereafter, according to some recipes, the slices are soaked in ice water, drained, and dried. Subsequently they are fried in a frying pan in deep fat or other hot oil bath at a 275° temperature for about five minutes.

Thereafter the slices are removed and refrigerated. After complete cooling, a second oil bath is heated to 425° F. and the precooked slices are dropped into the hot oil bath and turned until the interior section ruptures and, due to the evaporation of the moisture in the potato as steam, the slices puff into round or elliptically shaped potato puffs. When suitably burrowed the puffs are removed from the hot oil bath, salted, and eaten. Additional recipes for the preparation of potato puffs or potato souffles are found in the following cookbooks or textbooks, along with a brief note as to their special emphasis:

The Gourmet Cookbook—published by Gourmet Distr. Corp., New York (1960 edition), copyright 1950, page 198—Idaho or Maine Potatoes (recommended).
Joy Cookbook—pub. by Bobbs-Merrill Co., Inc., Indianapolis, Ind. (1964), page 294—Idaho or Burbanks Holland Potatoes (Best), cut with grain 25 min., ice water agitation (numerous detailed steps).
Larousse Gastrononique—pub. by Crown Publishers, Inc., New York, 1961, page 769—Special Fat or Oil discussed.
The Art of French Cooking—pub. by Golden Press, New York, 1962, page 510—Dutch Potatoes (recommended).
The Settlement Cookbook—pub. by Simon & Schuster, New York, 1965, page 403.

Partial puffing, at best, results from following the prior art recipes. Furthermore, the majority of the potato slices in the prior art receipes will not puff at all. In addition, two baths of hot oil are required and the conditions for control to achieve even a limited yield are numerous and difficult to supervise. In the event a slight deformation appears in any of the potato slices during the first or second portion of the treatment they usually will not expand. Also expansion may be limited, or one side may remain flat. In addition, it is difficult or impossible to freeze any of the potato puffs made in accordance with the prior art processes. Existing restaurant equipment is not available for controlling the process properly, and quite obviously then in the household kitchen two deep fat fryers with closely controlled temperatures are an impractical luxury. Also the use of tongs, spatulas, or other control device for turning the slices or puffs to achieve even browning have a strong tendency to puncture and deflate the puffs.

In view of the foregoing it is the principal object of the present invention to teach a method for the preparation of potato puffs which results in a maximum yield of symmetrical, fully puffed potatoes.

Another important feature of the invention looks to the provision of a method for making potato puffs which admits of the most difficult steps being performed under factory conditions, and the product frozen. Thereafter the method provides for a simple and effective technique for reconstituting the frozen intermediate product to result in a simple and high yield subsequent preparation of ready to eat potato puffs.

Still another object of the present invention contemplates the provision of an intermediate frozen potato puff product which, upon thawing and warming, can be dropped into hot oil at approximately 400° F. for less than two minutes and produce a very high yield of fully puffed symmetrical potatoes.

Still another object of the present invention is to provide a submerging racking apparatus which will insure a high degree of uniformity in the preparation of the intermediate frozen potato product. A related object of the invention looks to the provision of a second submerging racking apparatus for the finalization of the method to produce the fully puffed potato in a safe, efficient, and economical manner.

A further advantage of the invention results from a process which will produce a high yield and quality from almost any grade, brand, or species of potato.

Another two-fold object of the invention is to provide a rapid process for making potato puffs which results in lower cost and further reduces the fat or grease content of the potato puff product.

Still another and more detailed object of the invention looks to the provision of fully puffed potato products which, on one side fully puffs crisply and on the other side has a meaty portion which retains the potato flavor. Thus the consumer has a twofold taste and edible sensation from a product which visually is also unique and tempting.

Further objects and advantages of the present invention will become apparent as the following description of an illustrative embodiment proceeds taken in conjunction with the drawings attached hereto for purposes of illustration only in which:

FIG. 1 is a perspective partially diagrammatic view of a two bath hot oil system usable in the preparation of the potato puffs of the invention.

FIG. 2 is a perspective view of the rack employed in the first or low temperature step in the method of the preparation of potato puffs.

FIG. 3 is a persepctive view illustrating how the potato slices may be prepared for use in the potato puff process of the invention.

FIG. 4 is an end view of a typical raw potato slice prior to processing.

FIG. 5 is an end view partially cut away of a partially processed potato.

FIG. 6 is a transverse sectional view of the first step potato rack illustrated in FIG. 2 and taken along section line 6—6 of FIG. 2.

FIG. 7 is a top view of the first stage rack shown in FIGS. 2 and 6.

FIG. 8 is a perspective view of the rack employed in the second or final step of the method for the preparation of potato puffs and which may be used by restaurants, in the home, and the like.

FIG. 9 is a top view of the second stage rack shown in FIG. 8.

FIG. 10 is a transverse sectional view of the second stage and final stage potato puffing rack taken along section line 10—10 of FIG. 8.

FIG. 11 is a front elevation of a potato puff made from a transverse slice. The phantom lines illustrate the configuration of a potato puff made from a similar potato but along a longitudinal slice.

FIG. 12 is a transverse sectional view of the potato puff shown in FIG. 11 taken along section line 12—12 thereof.

As set forth above, it has been known in the past that potato puffs can be made by frying potatoes in two separate baths, the first at approximately 275° F. and the latter at approximately 425° F. The present invention stems from the discovery that uniformity, high yields, and an intermediate product which may be frozen and stored for subsequent use can be readily prepared if the necessary steps of completely submerging the potato slices in an oil bath, and confining the potato slices along their edge portions, with a preferred orientation in a vertical plane are performed in both of the hot baths. This description will proceed by first discussing the complete method, then the intermediate methods, followed with a description of the products and then the details of the apparatus employed.

METHOD

To prepare potato puffs in accordance with the present invention, any potatoes of convenient size may be used. The potatoes are first peeled. After peeling no washing, chilling, or other processing steps are required. The potatoes are then sliced either longitudinally or transversely depending upon whether the potato puff is to have the configuration of a ball or a banana. The slices may vary in thickness between 1/8" and 3/16". The 1/8" slices when puffed are generally crisper, whereas the 3/16" slices when puffed conform more fully to the product of the subject invention in which one side of the puff is thin whereas the other side (or opposed portions) has the remaining meat of the potato clinging to it, thereby retaining the potato flavor and texture.

The slices are then readied for complete immersion in a hot oil or fat bath at approximately 275° F. by placing them in a first rack 14 which is heavily perforated, and in which the vertical sidewall spacing S (see FIG. 6) is approximately one-half inch apart. In the first step it is preferred to confine the slices for partial expansion. Also, it is necessary to achieve the full immersion by edge contact on the slices. Therefore a cover or lid 16 is provided on the first rack 14 so that the raw slices can be completely submerged.

The raw slices as racked and as shown in FIG. 6 of the accompanying drawings are then dropped into the 275° F. bath 10 (see FIG. 1) for approximately six minutes. Following immersion in this first bath at the lower temperature, the partially expanded or puffed potatoes may be drained and cooled before being cooked in the higher temperature bath to finally expand the potato puffs. Alternatively, the intermediate or partially expanded product may be obtained by cooking in the lower temperature bath, removing, and then quickly plunging the potato slices in the higher temperature cooking bath. To illustrate, the raw slices are again racked as shown in FIG. 6 and cooked in the 275° F. bath for about six minutes. They are then removed, and plunged for approximately five seconds into the 425° F. bath 11 and completely submerged for that period of time. A rapid bubbling or boiling action will be observed on the surface of the 425° F. oil bath 11. A partial interior separation of the meat will occur in all of the slices (see FIG. 5). The exterior will become brown and form a surface or exterior seal.

After removing the thus pre-prepared intermediate or ruptured potato puffs, the first rack 14 is then permitted to drain at room temperature for approximately two to five minutes. At some time between one and one-half and two and one-half minutes the potatoes will begin to collapse which have partially inflated after cooking in the first or lower temperature bath, or after cooking in such bath and being in the fast plunge in the 425° F. bath. By shaking the first rack 14 with its open end 22 downwardly, the pre-prepared potato puffs will drop out once they are fully deflated. An alternative rack with a removable cover or lid 16 will also serve as an alternative construction. After approximately five minutes of cooling the intermediate or ruptured potato puffs 21 will have deflated and are ready to be packed, layered and frozen. No particular technique is required except that the slices are desirably separated from each other at this stage. It is possible, of course, to transfer the intermediate puffs 21 directly to the second rack 15 and complete the process.

In the event the process is to be continued, the intermediate puffs 21 are dropped in the second rack 15 as shown in FIG. 10, the lid 39 is closed and locked in place by means of the latch 18, and the second rack 15 plunged into the hot bath 11 for a period of time between 30 seconds and one and one-half minutes.

In the second bath, just as in the first bath, it is necessary that the precooked slices be oriented for edge confinement, preferably vertically, and also that they be fully submerged. The second rack 15, however, is provided with a larger width or puff space (PS) so that the potatoes can puff up to their natural puffed size. A puff space of approximately one and three-eighths inches has been found to be a good average desirable width. For larger or smaller puffs a width of suitable dimension should be provided. It has also been found desirable to curve the bottom 24 of the second rack in each of the compartments 19 to assist in the random vertical orientation and edge confinement as illustrated in FIG. 10. It is also highly desirable that the potatoes be oriented lengthwise out of edge-to-edge contact, as shown in FIG. 9. If the slices should contact each other upon puffing, flat spots will occur at points of contact except where edge-to-edge contacts occur.

INTERMEDIATE METHODS

As indicated above, one of the principal advantages of the present invention resides in the method for preparing a partially ruptured potato puff which can be frozen, reconstituted, and then uniformly puffed in a simple second process.

The method for preparing the intermediate product includes all of the steps set forth above until the partially puffed slices are removed from the first hot oil bath at 275° F.

While the first bath slices remain in the first rack they are permitted to drain for a short period of time, not exceeding one minute. The drain is desirable to reduce the fat or oily content of the frozen intermediate product. Thereafter the pre-puffed or partially ruptured potato slices may be plunged for approximately five seconds in a hot oil or fat bath at a temperature between 400° F. and 425° F. It is important, particularly during the short plunge, that the partially ruptured potato slices be confined for edge contact, preferably vertically oriented, and fully submerged in the hotter or second bath. It is also important that the partially ruptured or partially prepared potato slices be confined to expand to less than 50 percent of their fully intended or potential expansion. As indicated above, with the average potato confining the expansion during the hot plunge to a maximum of 1/2" produces excellent intermediate slices.

The slices are removed from the hot oil bath and permitted to drain in the rack. Within one to three minutes those slices which have been fully ruptured, but not completely puffed, will slowly collapse. Their thickness will be reduced to a thickness only slightly wider than the original raw slices. Although the exterior portion of the slices will be sealed and partially cooked, the interior portion will not be.

After cooling and collapsing, the intermediate product is then ready for freezing. Good results have been obtained when the intermediate pre-puffed potato slices are layered twelve in each layer, and separated by freezer paper or similar preparation. They may then be placed in a deep freeze and frozen and stored for a considerable period of time. In addition, normal refrigeration will serve to keep the partially puffed slices ready for ultimate puffing for about the same period of time as a French fried potato may be held in a refrigerator.

The intermediate frozen product, as will be discussed in greater detail hereinafter, is characterized by a partially sealed exterior portion, and substantially interior ruptured center area in which the meaty portion adheres to one side, and a thin crusted portion appears on the opposite side.

RECONSTITUTING FROZEN PARTIAL PUFFS

In reconstituting and completing the frozen partial puffs, it is important that they be properly warmed in order to eliminate all internally-locked ice crystals. For best results, a twelve-sliced section, eight layers deep, is placed in an oven and preheated at 275° F. for thirty minutes. Thereafter, the interior portion of the partially puffed or ruptured slices will be free of ice crystals, and generally the entire pre-puffed slice will be warmed beyond normal room temperature, to a temperature above 100° F. It is possible to preheat the slices in a warm area or over an oven for a matter of several hours with the same results, but of course, storage under these conditions may become a problem. It should be pointed out that the warming not only speeds up the final puffing, but it reduces the rejects. Conversely, if the frozen pre-puffed or partially ruptured slices are placed in the final bath between 400° and 425° F. the percentage of slices which do not puff or only partially puff is greatly increased. Furthermore, the uniformity of cooking on both sides of the slice is insured by warming.

After the frozen slices are warmed, they are again confined for edge contact, generally vertically aligned, and fully submerged in the hot bath at 400° F. to 425° F. between thirty seconds and two minutes. The thicker the slice, the longer period of time required.

Here it should be pointed out, as with the initial step for partially rupturing the puffed potato slices, it is necessary that the slices be completely submerged in the hot oil or fat, and also that they be generally confined for edge contact; otherwise flat spots will appear where any contact occurs other than along the edge of the slice. In the event the slices are not completely submerged, the puffing will usually occur on the one side only, leaving the other side flat.

The confining means for the second step and reconstituting steps are best fabricated from a mesh or perforated material with an irreducible minimum of confining material to minimize heat loss and maximize a circulation of the hot oil or fat. In addition, the walls confining the partially prepared slices should be spaced a distance approximately that of the diameter of the completed puff. It has been found that a 1⅜" puff space (PS) (FIGS. 6, 8 and 10) is ideal for most applications. Naturally, with larger potatoes, a larger space may be required, and with smaller potatoes, a smaller space will be adequate.

In the reconstituting or the second and final step, it is therefore important to separate the slices each physically from the other except along their adjacent edges. It is further necessary that the second step be performed in a bath of hot oil or fat. When the partially ruptured, preheated slices are heated in an oven at 425° F. the precooked slices tend to bake brown, or burn on the edges.

It has been further observed that the preheating step is necessary for uniformity of yield.

METHOD EXAMPLES

The general steps employed in the overall method as set forth above will be better appreciated by reviewing a few specific examples proceeding from the ideal to the less ideal and unsatisfactory methods:

Example 1

Six thin-skinned potatoes approximately the size of a fist are first rinsed in cool water and peeled with an ordinary potato peeler. Thereafter, half are sliced longitudinally ³⁄₁₆" thick, and half sliced transversely ³⁄₁₆" thick. A bath of hot oil is heated to 275° F. containing corn oil, cooking shortening, generally known under the trademark Wesson oil. An ordinary household deep fat fryer may be employed. A large thermometer is inserted in the same to control the temperature to plus or minus 5° F. by coordination with the rheostat. The potato slices are fitted in the longitudinal slots of a first rack 14 generally as shown in FIG. 2 of the accompanying drawings. As illustrated in FIG. 9 of the accompanying drawings, the slices are positioned in end-to-end relationship without overlapping contact. Thereafter, the first rack 14 is immersed completely in the first bath of hot oil at 275° F. for six minutes.

Upon removing the first rack 14 from the first bath of hot oil, the rack is permitted to stand at room temperature and the oil drain off the slices. In approximately one and a half minutes the partially puffed slices begin to collapse and by upending the first rack 14, they will drop out on kitchen toweling and cool to a temperature where they are not uncomfortable to handle. Immediately thereafter, a second rack 15 (see FIGS. 8, 9, and 10) is employed and the pre-puffed slices positioned as shown in FIG. 9. The lid 16 is then closed and locked, and the second rack 15 plunged in the second bath of hot oil at 405° F. for one minute. The slices will puff uniformly and turn a golden brown color. The longitudinal slices will take on the configuration of a banana, and the transverse slices the configuration of a bonbon. As illustrated in FIG. 12, one side of the slice contains the bulk of the meat, and the other side is thin and crispy. In some instances, particularly on the longitudinal slices, ⅔ of the length on one side will be meaty, and ⅓ of the length (continuing longitudinally) of the opposite side will be meaty.

After the puffs are permitted to cool at room temperature, they are salted conveniently prior to cooling, and served.

Example 2

The identical process as set forth in Example 1 above is repeated with the first rack and first bath at 275° F. Upon removal, it is observed that about ⅔ of the slices have partially puffed out to the side walls of the rack which are spaced approximately ½" apart. Thereafter, the rack is permitted to drain at room temperature, upended, and between one and a half and two and a half minutes the slices will collapse to the point where they may be dropped out the open ends.

The slices are then permitted to cool at room temperature, and twelve slices are placed in a generally rectangular pattern on freezer paper, and eight such layers are prepared. Thereafter they are placed in a deep freeze at a temperature of between 0° and 10° F., for twenty-four hours. All of the slices will be observed to have been completely frozen.

Upon removing the frozen slices from the freezer they are then permitted to warm up to a point where the freezer paper may be stripped from the slices, placed upon a cookie sheet, and inserted in a kitchen oven preheated to 275° F. for thirty minutes. At the end of the thirty minute period no ice crystals are observed in samples which were cut. After preheating is completed, the second step in the second rack as set forth in Example 1 is employed, and uniformly good results are obtained.

Example 3

The Examples 1 and 2 above are repeated identically, except that ⅛" slices are employed. In the first bath at 275° F. they are submerged completely for six minutes. A greater degree of partial puffing is observed than with the 3/16" thick slices.

In the second step the complete submergence at 405° F. should not exceed thirty seconds. The slices are uniformly puffed, a rich golden brown on the exterior portion, but the meaty portion adhering to one side of the interior is substantially reduced rendering the cross section more uniform and the puffs crisper than when the 3/16" slices are employed. It will be further observed that when the pre-ruptured or partially prepared slices of this example are submerged for a minute to a minute and a half in the 405° F. that they over-cook and become a dark brown of less desirable texture and appearance.

Example 4

Three-sixteenth inch slices are prepared in accordance with Example 1 and run through the first bath for six minutes at 275° F. They are thereafter frozen in accordance with Example 1. Subsequently the slices, in a partially frozen condition, are placed vertically in the second stage rack 15, as illustrated in FIG. 8, and placed in a preheated oven at 425° F. and observed at five minute intervals. After five minutes, partial puffing is observed in less than fifty percent of the slices. After ten minutes, the slices which had not puffed by five minutes will become baked. After fifteen minutes burning will begin. None of the oven-baked products are considered first quality by comparison to those prepared in accordance with Example 1.

Example 5

Three-sixteenth inch slices of potatoes are prepared in accordance with Example 1 and frozen. They are thereafter thawed at room temperature for five hours. The slices are then thrown on top of a hot oil bath at 405° F. All of the slices will immediately orient themselves horizontally on the surface of the fat, and begin to expand partially on one side only. The other side remains flat. By hand-maneuvering a few slices may be partially oriented along the vertical axis and will exhibit a more uniform degree of puffing but far less than those puffs prepared in accordance with Example 1.

Example 6

Again, 3/16" slices are prepared in exact accordance with Example 1, but not frozen. Thereafter, the slices are positioned in a rack similar to the second stage rack 15, as shown in FIG. 8, but without the dividing walls to orient the slices generally along a vertical axis. They are then submerged in the second rack with the lid closed for one minute in a hot oil bath at 405° F. All of the puffs rise to the lid portion of the second rack and remain flat where the lid is contacted. The cooking is generally to a uniform degree of completion, but the product deemed unacceptable due to the half-round exterior configuration.

This example is repeated in accordance with the above after the immediate freezing and thawing for thirty minutes in a preheated oven at 275° F. The results are still the same, namely, that the ultimate cooked product is only half puffed, a flat side remaining where the slices contact the lid. In addition, in those instances where the loose slices float to the top of the lid in an overlapped relationship, further flat surfaces are observed at the contact points between two slices.

SUMMARY OF EXAMPLES

It will become apparent, therefore, from the foregoing examples and the method steps as outlined in detail previously, that it is critical to completely submerge the slices in both the 275° oil bath and the oil bath between 400° and 425° F. Further, for uniformly round and acceptable completely puffed products, they must be oriented vertically in both the first and second baths with the puffing generally constrained in the first bath but permitted to run the full course in the second bath. In addition, where the intermediate product is frozen, it is critical to uniform high yield and excellent quality to preheat the slices to remove all traces of ice crystals prior to completing the puffing in the hot oil bath between 400° and 425° F.

APPARATUS

The apparatus described generally above which may be usefully employed in connection with the method is set forth in detail in the drawings. As will be noted, the first bath 10 is represented as a deep fat fryer or similar type unit which has rheostat temperature control 25 and a direct reading thermometer 26. The first bath 10, as indicated above, is held desirably at 275° F., as indicated. The second bath 11 is similar to the first bath 10 in that it also employs a rheostat temperature control 25 and a direct reading thermometer 26, and the temperature is held in the range of 400° to 425° F. It will be appreciated that for restaurant usage the second bath for reconstituting the frozen slices may well be substantially larger than that shown, and it may be also conveniently provided with a rack over the top whereby the radiant heat from the bath may be employed to preheat the frozen slices to eliminate the locked-in ice crystals and bring them up to a second bath reconstituting and final puffing preheat condition.

The first rack 14 is fabricated from a ½" wire mesh. The wire is employed because it permits a maximum of circulation and induces a minimum of heat loss. The first rack shown includes a first rack lid or top 16 which is generally rectangular with chamfered corners 28 and a bottom 29 of approximately the same configuration. A first rack handle 30, which is formed from a single wire doubled back upon itself, is secured by weldments 31 to the top or lid 16.

A plurality of vertical dividers 32 are provided on ½" centers in parallel relationship and connected to the lid 16 and the bottom 29 so as to define a plurality of slots 34 having open ends 22. As will be observed in FIG. 6, the slots 34 are of height between ten and fifty percent greater than the height of the slices to be inserted. It will be further observed that the proportion is such that a partial rupturing or puffing of the role of raw slices 20 can be accomplished within the slots 24, the first rack 14 removed, and after collapsing, the slices can be dumped out the open end 22. The slot width S (see FIG. 6) is ideally ½". In the event the width is ¼" a 3/16" slice will not pre-puff to that degree which prepares it properly for the second hot bath, or for the intermediate freezing step. On the other hand, if the width S is one inch or greater, too much puffing may well occur in the first step, and reduce the yield in the final step, or in the alternative, require perforating or spoilage of the puffed slice prior to collapsing and freezing the intermediate product. While the precise dimension is not considered critical, a dimension of the width S which permits only partial puffing in the first bath is considered desirable for high yield.

The second rack 15 illustrated in FIGS. 8 through 10 inclusive has a pair of opposed end walls 35 with a rounded or scalloped bottom. The curved bottom 24 extends upwardly to form opposed parallel ends 36 as thus illustrated in FIG. 10. All of the members are formed of ½" wire mesh as is the first rack 14. Vertical dividers 38 are provided at each of the top portions of the curved bottoms 24 and define between adjacent members the compartments 19 into which the pre-puffed, reconstituted, or first step slices, which are partially ruptured, are inserted as indicated in FIG. 9. The foldable lid 39 is secured by means of hinges 40 to one of the ends 36 of the bottom, and covers the entire area defined by the compartments 19 and is secured in the down position by means of the latch 18. Once the lid is down, as illustrated in FIG. 10, the slices are confined along a general axis by virtue of the curved base 24 and the side walls 36 cooperating at a distance to define a puff space P.S. of approximately 1⅜". It will be noted again in FIG. 10 that the angular disposition of the slices is greater than 45° with the horizontal, and the top edges of the slices of the larger size are within approximately 10 percent of their diameter of the folding lid 39. The phantom lines in FIG. 10 indicate the general configuration to which the slices will puff in the second rack 15 when the same is plunged into the 400°–425° F. bath for thirty seconds to two minutes. The handle 41 is grasped by the operator after the foldable lid 39 is secured to the latch 18, and the second rack 15 dropped into the second bath 11 as indicated. It will be borne in mind that the second bath step will generally be performed in a restaurant, hamburger drive-in, and the like where rugged simple equipment is required. The construction of the second rack 15 conforms to these requirements, and further permits ready visual inspection by the user in the course of puffing the potatoes.

THE PRODUCT

While the method and apparatus have been defined in great detail above, it should also become apparent that a unique, intermediate, and finally puffed product result from the method. The intermediate product, of course, is a partially puffed, deflated, partially cooked potato slice in which the opposed portions at the interior rupture are bilaterally asymmetrical. By bilaterally asymmetrical it is meant that the meaty portion will cling to one side or the other, but not split in the middle, and thereby, upon final puffing, provide a different taste sensation and texture within the same potato puff. In the intermediate product, of course, in its frozen condition, particulate ice crystals are formed which closely hold the two sides of the partially ruptured or pre-puffed potato slice together.

The final product differs from the intermediate product in that the ice crystals are not present, and it is fully puffed to a configuration substantially circular in a plane perpendicular to the longitudinal axis in which one side of the circular portion is meaty, and the opposed side is relatively crisp. It should again be emphasized that the adherence of the meaty portion to the potato is on an asymmetrical basis, and that is, throughout the entire length of a longitudinal slice there may well be meat on one side of the slice for half of the length, and meat on the opposite side for the other half of the length. In no instance, however, will the meat be uniformly adhering to opposed sides of the puff. It is this asymmetrical relationship of the meat of the potato that provides an additional taste sensation which results from making puffs in accordance with the present invention.

In summary, it will be observed that a method has been taught for the preparation of an intermediate potato puff which can be readily frozen and stored. Furthermore, the method for insuring a high yield of potato puffs, whether prepared from the stored frozen product, or in a continuous operation, has also been described. The method permits fast cooking which results in better sealing, fuller puffing, uniform browning, and reduced fat or oil content in the final product. Finally, the apparatus has been described in detail which will permit the method to be carried on in an inexpensive manner and with excellent yield.

Although particular embodiments of the invention have been shown and described in full here, there is no intention to thereby limit the invention to the details of such embodiments. On the contrary, the intenton is to cover all modifications, alternative embodiments, usages and equivalents of the potato puffing process as fall within the spirit and scope of the invention, specification and appended claims:.

I claim:
1. In the method for making potato puffs from thin slices of raw potatoes, each having substantially parallel opposite faces and a peripheral edge by a two-bath cooking in hot oil, one first bath at a lower temperature to partially puff the slices and one second bath at a higher temperature to finally puff the slices, the improvement comprising the steps of orienting the slices in a first confining means so that their peripheral edges are substantially vertical within said confining means, said confining means having a limited puff space to obtain a partially puffed condition in said first bath, submerging said slices and confining means in said first bath so that said slices are completely submerged and the peripheral edges of said slices contact said confining means and thereby maintain immersion of said slices in said bath, cooking said slices in said bath for a time and at a temperature sufficient to obtain a partially puffed potato, removing and cooling the partially puffed slices, orienting the partially puffed slices in a second confining means so that the peripheral edges of the partially puffed slices are substantially vertical, submerging the second confining means and partially puffed slices in a second bath, so that said slices are completely submerged and the peripheral edges of said slices contact said confining means and thereby maintain immersion of said slices in said bath, said second confining means having a puff space sufficient to obtain a finally puffed condition, and cooking for a time and at a temperature sufficient in said second bath to obtain a finally puffed potato.

2. In the method of claim 1 above, the additional step of limiting the puff space within the first bath so that the slices expand substantially not in excess of 50 percent of their original width.

3. In the method of claim 1 above, the additional step of providing a puff space within the second bath so that said slices may expand to a multiple of their original width.

4. In the method of claim 1 above, the additional step of quick-plunging the potato slices in an oil bath at between about 400° F. and 425° F., said potato slices being submerged for about five seconds in said quick-plunge, and said quick-plunge being executed immediately after the potato slices are removed from tha first hot oil bath and prior to cooking in said second oil bath.

5. The method of making an intermediate partially puffed potato, comprising the steps of orienting thin potato slices, each having substantially parallel opposite faces and a peripheral edge, in a confining means so that their peripheral edges are substantially vertical within said confining means, said confining means having a limited puff space, submerging said confining means and slices in a hot oil bath so that said slices are completely submerged and the peripheral edges of said slices contact said confining means and thereby maintain immersion of said slices in said bath, cooking said slices in said bath for a time and at a temperature sufficient to obtain a partially puffed condition, removing said slices from the bath, cooling said slices to obtain partially puffed slices which are collapsed and internally ruptured, and storing said partially puffed slices for later cooking to a finally puffed condition.

6. In the method of claim 5 above, the additional step of submerging the confining means and slices for 5 to 6 minutes at about 275° F.

7. In the method of claim 5 above, the additional step of confining the expansion to about ½ inch within the puff space.

8. In the method of claim 5 above, wherein said thin potato slices are from about ⅛ inch to about 3/16 inch thick.

9. In the method of claim 5 above, the additional step of freezing the partially puffed slices to obtain better storage.

10. In the method of claim 9 above, the additional step of pre-heating the frozen slices and warming the same to a temperature above about 100° F. to remove all ice crystals prior to final puffing.

11. The method of making a potato puff from frozen partially puffed potato slices prepared by the method of claim 9 above, comprising the steps of moderately pre-heating such slices until all ice crystals disappear, orienting the slices in a confining means so that their peripheral edges are along a generally vertical axis within said confining means, said confining means having a puff space sufficient to finally puff the partially puffed slices, and completely submerging the confining means and slices in a hot oil bath between about 400° F. and 425° F. to completely puff the slices.

12. In the method of claim 11, the additional step of submerging the confining means and slices for a time interval between about 30 seconds and 2 minutes.

13. In the method of claim 11, the additional gap of pre-heating the frozen slices in a pre-heated oven at 275° F. for 30 minutes.

14. The method of making a potato puff from partially puffed potato slices prepared by the method of claim 5 above, comprising the steps of orienting the same in confining means so that the peripheral edges are along a generally vertical axis, said confining means having a puff space sufficient to allow the partially puffed slices, to expand to the final condition, and completely submerging the confining means and slices in a hot oil bath between about 400° F. and 425° F. for sufficient time to completely puff the slices.

15. In the method of claim 14, the additional step of limiting the expansion in the puff space to about 1⅜ inches.

16. In the method of claim 14, the additional step of submerging the slices for a time interval between 30 seconds and 2 minutes.

References Cited

UNITED STATES PATENTS 3,355,299  11/1967  McLaughlin et al. _____ 99—100

OTHER REFERENCES

Montagne, P.: Larousse Gastronomique, The Encyclopedia of Food, Wine, and Cookery, 1961, Crown Publishers, Inc., New York (page 769).

A. LOUIS MONACELL, Primary Examiner

D. M. NAFF, Assistant Examiner

U.S. Cl. X.R.

99—193